Jan. 15, 1957 J. B. BRENNAN 2,777,929
METHOD AND APPARATUS FOR WELDING METAL ELEMENTS
Filed July 21, 1952 2 Sheets-Sheet 1

INVENTOR
JOSEPH B. BRENNAN

BY *Young, Emery & Thompson*

ATTORNEYS

Jan. 15, 1957  J. B. BRENNAN  2,777,929
METHOD AND APPARATUS FOR WELDING METAL ELEMENTS
Filed July 21, 1952  2 Sheets-Sheet 2

INVENTOR
JOSEPH B. BRENNAN

BY *Young, Emery & Thompson*

ATTORNEYS

United States Patent Office 2,777,929
Patented Jan. 15, 1957

2,777,929

METHOD AND APPARATUS FOR WELDING METAL ELEMENTS

Joseph B. Brennan, Cleveland, Ohio

Application July 21, 1952, Serial No. 300,018

5 Claims. (Cl. 219—10)

The present application is a continuation-in-part of my copending application Serial No. 743,374, filed April 23, 1947, Patent No. 2,604,517, July 22, 1952.

This invention relates in general to the high frequency electric welding or bonding of metal elements together.

In the welding or bonding of sheets or strips of metal, spot welding is widely used. This type of welding is not always satisfactory because of the lack of uniformity of the bond between metal elements and because of the impurities incorporated in the bonded metal elements from the metallic spot welding electrodes.

An object of this invention is to avoid the disadvantages of spot welding procedures in the bonding of sheets or strips of metal.

Another object of this invention is to provide an apparatus and method for welding or bonding sheets or strips of metal by high frequency electric current heating and mechanical pressure.

A further object of this invention is to provide an apparatus including means for heating metal sheets or strips to be welded by high frequency induction and pressure applying elements of a refractory dielectric material.

Other objects will appear hereinafter in the following description.

To facilitate an understanding of the invention, reference is made to the accompanying drawings in which.

Figure 1:
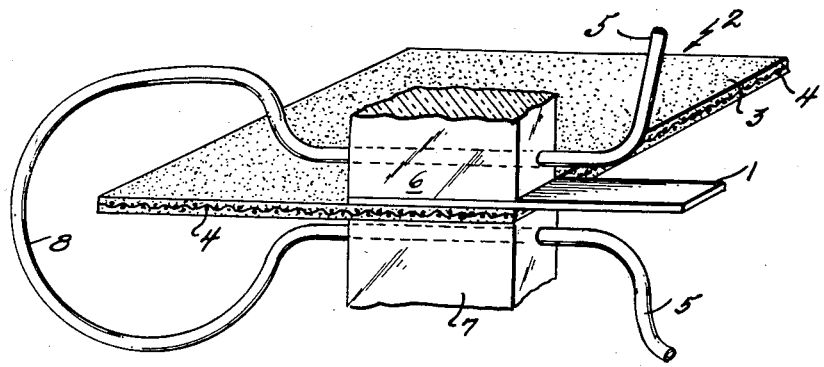
Figure 1 is a perspective view of apparatus for welding two metal elements together.

In Figure 1 the apparatus of the present invention is shown in use for welding a terminal 1 to an electrode 2 formed of a layer of particulate metal 3 on a strip of flexible fibrous material 4.

Heating is accomplished by inducing eddy currents in the metal of the electrode and terminal by a high frequency current flowing through the tubular conductor 5. Conductor 5 is connected through suitable leads to a source of high frequency current, and water or other suitable coolant is circulated therethrough to prevent overheating of the conductor and of the members 6 and 7. Pressure is applied to the heated material by members 6 and 7 which engage the surface of the terminal 1 and the electrode 2, respectively. These members 6 and 7 are preferably composed of a refractory dielectric material such as asbestos, fused quartz, glass, porcelain, or other refractory dielectric material which will not contaminate the subsequently produced condenser if traces of the material are left on the parts.

When the high frequency current flows through conductor 5, the induced eddy currents cause the metal of the terminal member 1 and the electrode 2 between the members 6 and 7 to become almost instantaneously heated to a welding temperature. At the same time, pressure is applied by means of the members 6 and 7 (which may be urged toward each other by any suitable mechanism such as a press) to embed the terminal 1 into the conductive layer 3 and to compact the material of the layer 3. The loop 8 in conductor 5 gives the conductor flexibility to permit the members 6 and 7 to be moved toward and away from each other. By these operations, the terminal 1 is securely bonded electrically and mechanically to the conductive layer 3. The operation is preferably carried out to produce a weld between the terminal 1 and the conductive layer 3, yet this is accomplished without possibility of contamination, for the material making up the members 6 and 7 is such that it will have no deleterious effect when the electrodes are subsequently incorporated in a condenser. Thus, even if traces of the dielectric material are left on the surfaces of the terminal or electrode, no damage to the electrolytic condenser including the electrodes will result. Also, the heat is generated in the metal so rapidly that the operation leaves the base material substantially intact, even when combustible materials such as textile materials, paper and the like are employed as bases upon which the metallic layers are deposited.

While in Fig. 1 a terminal of solid sheet metal is shown being bonded to a sheet of particulate metal, the invention and apparatus are equally applicable to the bonding of sheets or strips of solid metal to each other.

Figure 2:
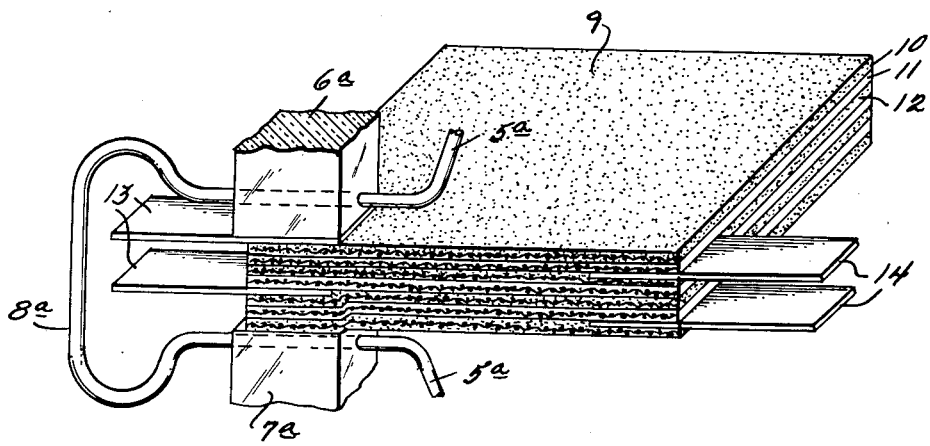
Fig. 2 is another perspective view of apparatus similar to that of Fig. 1 showing how a pile of pairs of metal elements may be simultaneously welded.

Figure 2 illustrates another modification of my method in which a plurality of terminals are bonded to their respective electrodes in a single operation. Here, reference character 9 indicates a condenser made up of a plurality of electrodes 10 and 12 which may, for example, be identical with the electrodes 2 shown in Figure 1, the electrodes being separated by spacers 11, terminals 13 are secured to electrodes 10 while terminals 14 are secured to electrodes 12.

In this form of the invention, the electrodes, terminals and spacers 11 are assembled together before the terminals 13, 14 are bonded to the electrodes 10, 12. The assembly before bonding is as shown in the left-hand portion of Figure 2, the terminals 13 resting upon the surfaces of the electrodes 10. An apparatus similar to that shown in Figure 1 and including members 6a and 7a and high frequency heating conductor 5a is used to bond the terminals to their respective electrodes. This is accomplished by disposing the apparatus as shown in Figure 2 with the ends of the members 6a and 7a in engagement with the condenser assembly in the areas where the terminals 13 overlap the electrodes 10, then causing a high frequency current to flow through the conductor 5a and applying pressure by means of the members 6a and 7a. The high frequency currents induce high frequency eddy currents in the metal layers or in parts thereof of the electrodes 10, heating the metal sufficiently to permit the assembly to be compacted to the same thickness as the remaining portion of the condenser assembly and welding the terminals to their respective electrodes. Inasmuch as the heat is generated only in the metal where it is needed, this operation can be carried out without destroying the insulating layers between the electrodes. The final result is shown at the right-hand portion of Figure 2 where the electrodes 12 and their terminals 14 are bonded together with the terminals embedded in the electrodes so that the thickness of the condenser in the terminal region is substantially the same as the thickness of the other portions thereof.

The procedure disclosed in Figure 2 is equally applicable to the bonding together of solid sheets of metal.

Figure 3:
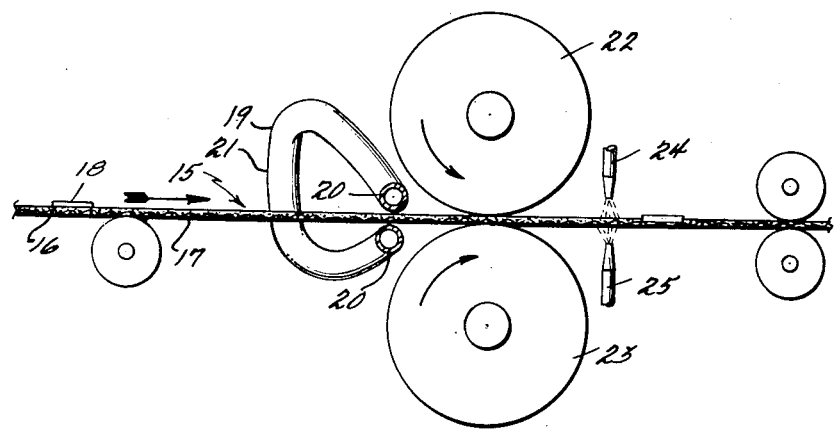
Fig. 3 is an elevational view of an apparatus for joining metal elements to a strip of metal.

In Figure 3 I have illustrated an apparatus and a method whereby electrode and terminal assemblies may be made by a continuous operation. According to this form of my invention, a large number of electrodes 15 may be made in the form of a continuous strip composed, for example, of one or more layers of flexible fibrous material 16 having porous conductive layers 17 of finely divided cohering metallic particles thereon. The strip may be provided with the layers 17 by sprays of molten metal directed against opposite sides of the strip as the strip is moved, and preferably the strip is subjected to a film-forming operation before the terminal members 18 are secured thereto. By this sequence of operations, the forming operation can be carried out efficiently; the terminal members 18 are subsequently secured to the strip at intervals selected to give the desired capacity for the separate electrodes into which the strip is subsequently cut.

The terminals are preferably bonded to the strip by an apparatus such as that shown diagrammatically in Figure 3 and consisting of a high frequency conductor 19 which is hollow to provide for water cooling as described in connection with the conductor 5. The conductor is supplied with high frequency current from a suitable source and has straight portions 20 which extend transversely across the strip 15 and are connected by a loop 21. The strip 15, with the terminal members 18 clinched thereto, is moved continuously between the two straight legs 20 of the conductor, and a high frequency current is caused to flow therethrough, inducing high frequency eddy currents in the terminals 18 and metal layers 17 and rapidly heating them. Immediately thereafter, while the metal is still hot, the strip passes between the rolls 22 and 23 which are rigidly supported and are arranged to bear lightly on the strip itself. The rolls thus slightly compact the heated metallic particles making up the layers 17, improving the strength and conductivity of the layers, and when one of the terminals 18 passes between the rolls, the terminal is embedded into the strip as indicated on the right-hand side of Figure 3. Thus, the rolls, because of their rigid mounting, insure that the series of electrode and terminal assemblies making up the strip are all of substantially uniform thickness throughout.

Like the members 6 and 7, the rolls 22 and 23 are preferably composed of a refractory dielectric material such as asbestos, fused quartz, glass, porcelain or other material which will not contaminate the subsequently produced condenser if traces of the material are left on the parts. The strip is moved rapidly through the apparatus so that the metal retains sufficient heat to insure the welding of some of the particles to the terminal members by the pressure exerted by the rolls 22 and 23.

The rapidity with which the heat is applied again prevents the destruction of the base materials 16 on which the layers 17 are deposited. If desired, the strip may be cooled by water sprays from nozzles 24 and 25 disposed immediately beyond the rolls 22 and 23.

Figure 4:
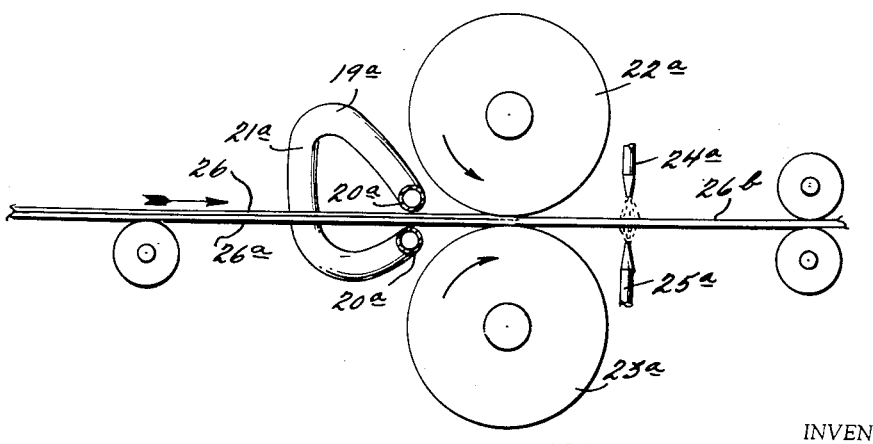
Fig. 4 is a similar view of a similar apparatus for joining two metal strips together.

The apparatus of Figure 3 is equally applicable to the bonding together of two strips of solid metal as well as particulate metal. As shown in Figure 4, two strips of metal 26 and 26a, each of which may be either solid metal or particulate metal, are moved continuously between the two straight legs 20a of the conductor through which a high frequency current is caused to flow. This current induces high frequency eddy currents in portions of the two strips 26 and 26a rapidly heating the portions thereof to a welding temperature. While so heated, the strips pass between the rolls 22a and 23a which press the strips 26 and 26a together to bond them together.

After bonding by heating and compressing, the composite strip 26b formed of strips 26 and 26a may be cooled by sprays 24a and 25a. The components 26 and 26a of the composite strip 26b are securely bonded together to form a unitary strip.

The present invention is also applicable to the densifying and compacting of a porous particulate metal article such as disclosed in my prior Patent No. 2,375,211. In place of using the welding procedure disclosed in the aforesaid patent, the strips or sheets of particulate metal may be passed through a high frequency field to heat the metal and then the so-heated metal may be pressed by refractory dielectric pressure members as shown in Figs. 1 and 2 or by rolls as shown in Figs. 3 and 4.

The present invention also contemplates the welding of two butted edges of metal strips or the welding of overlapping edges to form tubes.

From the foregoing, it will be readily appreciated that the present invention provides an apparatus and method for bonding together sheets and strips of metal of either solid or particulate form. The bond produced is highly effective and yet the heating is so rapid that the bond may be effected and the adjacent parts cooled off so quickly as to avoid damage to adjacent parts or elements.

Having described my invention, I claim:

1. An apparatus for welding together metal elements comprising a pair of pressing elements of refractory dielectric material mounted for pressing together said metal elements at least over a portion of their area, and a high frequency electric current conductor associated with each dielectric pressing element for inducing a heating current in said metal elements to heat to welding temperature an area of the metal elements while subjected to pressure of the dielectric pressing elements.

2. An apparatus for welding together metal elements comprising a pair of pressing rolls of refractory dielectric material mounted for pressing together said metal elements at least over a portion of their area, and a high frequency electric current conductor associated with each dielectric pressing roll for inducing a heating current in said metal elements to heat to welding temperature an area of the metal elements while subjected to pressure of the dielectric pressing rolls.

3. An apparatus as set forth in claim 1 wherein the conductor comprises a loop with straight portions extending transversely across the metal elements to be welded.

4. A method of welding together metal elements in the form of sheets and strips, comprising placing the elements in contact with each other, applying pressure to said elements through refractory dielectric pressure members above and below said elements, and inducing high frequency eddy currents in the contacting portions of the elements through conductors passing through said refractory pressure members to heat the elements to welding temperature while the pressure is being applied.

5. A method of welding together metal elements in the form of sheets and strips, comprising placing the elements in contact with each other, applying pressure to said elements through refractory dielectric pressure rolls above and below said elements, and inducing high frequency eddy currents in the contacting portions of the elements through conductors associated with said rolls to heat the elements to welding temperature while the pressure is being applied.

References Cited in the file of this patent

UNITED STATES PATENTS

| Number | Name | Date |
|---|---|---|
| 1,380,250 | Reymond | May 31, 1921 |
| 1,748,551 | Helle | Feb. 25, 1930 |
| 1,749,700 | Tourment | Mar. 4, 1930 |
| 1,842,461 | Sessions | Jan. 26, 1932 |
| 2,149,596 | Gillett et al. | Mar. 7, 1939 |
| 2,151,874 | Simons | Mar. 28, 1939 |
| 2,193,413 | Wright | Mar. 12, 1940 |
| 2,237,309 | McMinn | Apr. 8, 1941 |
| 2,273,609 | Wrighton et al. | Feb. 17, 1942 |
| 2,313,227 | De Bats | Mar. 9, 1943 |
| 2,367,715 | Chapman | Jan. 23, 1945 |
| 2,492,851 | Durst et al. | Dec. 27, 1949 |
| 2,604,517 | Brennan | July 22, 1952 |
| 2,627,010 | Matteson et al. | Jan. 27, 1953 |
| 2,640,796 | Langer | June 2, 1953 |
| 2,697,773 | Gordon | Dec. 21, 1954 |